United States Patent [19]

Yoshida

[11] Patent Number: 5,586,232
[45] Date of Patent: Dec. 17, 1996

[54] PROJECTION VIEW CREATION METHOD WITH VECTOR DISCRIMINATION ONTO PLANE-REPRESENTED CURVED SURFACES

[75] Inventor: Toshiharu Yoshida, Kawasaki, Japan

[73] Assignee: Fujitsu Limited, Kawasaki, Japan

[21] Appl. No.: 350,143

[22] Filed: Nov. 29, 1994

[30] Foreign Application Priority Data

Jun. 20, 1994 [JP] Japan ................... 6-136753

[51] Int. Cl.$^6$ .................................................. G06F 15/70
[52] U.S. Cl. ........................................................... 395/127
[58] Field of Search ................................... 395/127, 119, 395/121, 123, 129

[56] References Cited

FOREIGN PATENT DOCUMENTS 2-47784   2/1990   Japan .

OTHER PUBLICATIONS

Foley et al.; Computer Graphics: Principles and Practice; 1990; pp. 229–237, 471–477, 680–685, 698–711, 745–753, 772–773 1990.
Luzadder, Warren J.; Fundamentals of Engineering Drawing, eigth edition; 1981; pp. 69–73, 75–97, 145–154, 185–205, 213–232 1981.

Primary Examiner—Almis R. Jankus
Assistant Examiner—Cliff N. Vo
Attorney, Agent, or Firm—Staas & Halsey

[57] ABSTRACT

A method of creating a view of a curved line projected onto a curved surface in a CAD system by using a vector discrimination technique which reduces computation steps required for projection. The curved line and the curved surface are divided into a group of straight line segments and a group of planar surfaces, respectively. One of the straight line segments is selected and a first vector is formed at an end of the straight line segment. After a discrimination process using the first vector, a combination of one straight line segment and one planar surface pointed to by the first vector is obtained, and the projection operation starts with this combination. Second and third vectors are then formed at both ends of an edge of the planar surface. The straight line segments within the range delineated by the second and third vectors are projected onto the planar surface. If there is a straight line segment falling outside the range, the next planar surface is selected and the excessive part of the line segment is projected onto the newly selected planar surface. The projection operation thus continues until all the straight line segments are projected on the planar surfaces.

3 Claims, 15 Drawing Sheets

| |
|---|
| CENTER X-COORDINATE |
| CENTER Y-COORDINATE |
| INCLINATION OF ELLIPSE |
| LENGTH OF MAJOR AXIS |
| LENGTH OF MINOR AXIS |
| START ANGLE = 0° |
| TERMINATE ANGLE = 360° |

FIG. 4

| NUMBER OF VERTEXES |
| --- |
| START POINT |
| TERMINATE POINT |
| START TIME |
| TERMINATE TIME |
| X-COORDINATE OF VERTEX 1 |
| Y-COORDINATE OF VERTEX 1 |
| ⋮ |
| X-VECTOR OF VERTEX 1 |
| Y-VECTOR OF VERTEX 1 |
| ⋮ |
| INTERVAL LENGTH 1 - 2 |
| ⋮ |

PROJECTION VIEW CREATION METHOD WITH VECTOR DISCRIMINATION ONTO PLANE-REPRESENTED CURVED SURFACES

BACKGROUND OF THE INVENTION (1) Field of the Invention

The present invention relates to a projection view creation method, and more specifically, to a projection view creation method of creating a view by projecting a curved line to a curved surface on a two-dimensional CAD (computer aided design) system.

(2) Description of the Related Art

A CAD system is indispensable to a design job because a design specification becomes complex, a design and drawing job must be effectively carried out, a design period must be shortened and jobs accompanying the design must be simplified. The two-dimensional CAD system can optionally create drawings such as a design drawing and the like on a graphic display screen using basic figure elements such as a straight line, circle, arc and the like as well as edit created drawings. Further, when a drawing is completed on the screen, the two-dimensional CAD system can output the drawing by means of a plotter or the like and contain the created drawing in a storage medium so that it can be used later.

When the two-dimensional CAD system creates a perspective view from a plan view, front view and side view, the CAD system can display a three-dimensional configuration on a two-dimensional screen by projecting a figure observed from one direction to a figure observed from another direction. When a process for creating a view by projecting a curved line to a curved surface is carried out by the CAD system, the view is conventionally determined by an equation for calculating a shade made by the projection using equations of the actual curved surface curved line. As a result, when an element of a new configuration is added as an element desired to be projected, a unit for processing the equation of the new configuration is added so that calculation is carried out by an equation covering the additional configuration.

Nevertheless, in the conventional method of creating a view by projecting a curved line to a curved surface, since equations for expressing a curved surface and curved line are very complex, there is a problem that a program for executing a projection processing also becomes very complex. Further, since a different equation must be used to express a curved line to be projected or a curved surface to which projection is effected, there is also a problem that an exclusive program must be created in accordance with the curved line and the curved surface.

SUMMARY OF THE INVENTION

An object of the present invention is to provide a projection view creation method which need not prepare a calculation formula for each figure to be subjected to a projection processing and can prevent a program for executing the projection processing from being made complex.

To achieve the above object, there is provided a projection view creation method of creating a projection view by projecting a curved line to a curved surface. The projection view creation method comprises the steps of dividing and converting a curved line to be projected and the curved line representing the cross section of a curved surface to which projection is effected into a first broken line and a second broken line each composed of a group of straight lines, creating two vectors directed to the first broken line from the both ends of one of the straight lines of the second broken line, and projecting one of the straight lines constituting the first broken line to a plane having the straight line constituting the second broken line as its side within the range designated by the two vectors.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 4 is a view showing a data structure of an ellipse by way of example;

FIG. 5 is a view showing a data structure of a spline curve by way of example;

DESCRIPTION OF THE PREFERRED EMBODIMENTS

An embodiment of the present invention will be described below with reference to the drawings.

Figure 1:
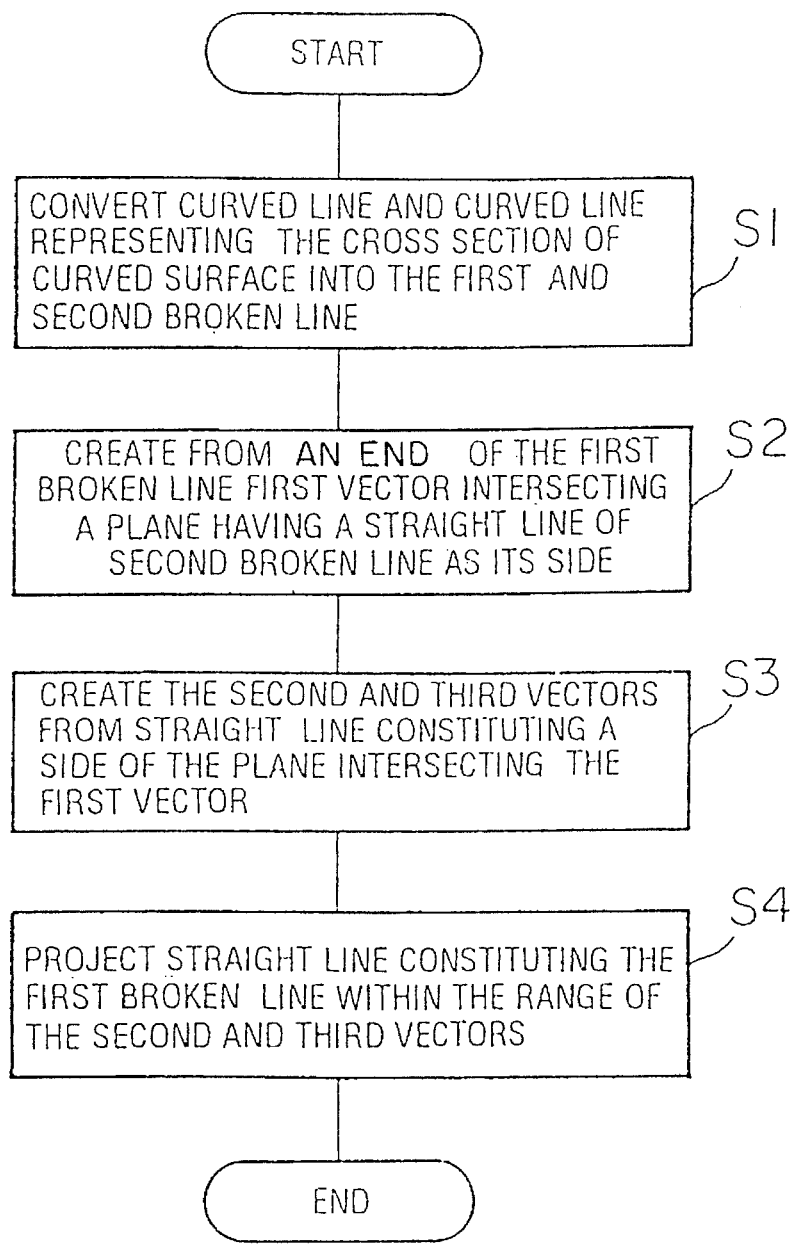
FIG. 1 is a flowchart showing the principle of a projection view creation method according to the present invention.

FIG. 1 is a flowchart showing the principle of a projection view creation method according to the present invention.

According to the projection view creation method of the present invention, first, a curved line to be projected and a curved line representing the cross section of a curved surface to which projection is to be effected are finely divided and converted into first and second broken lines each composed of a group of straight lines, respectively at step S1. Next, at step S2, a first vector is created from an end of one of the straight lines constituting the first broken line toward a direction in which the first vector intersects a plane having one of the straight lines of the second broken line as its side.

At step S3, second and third vectors are created from the two ends of the straight line of the second broken line constituting one edge of the plane intersecting the first vector. Then, at step S4, the first broken line within the range designated by the second and third vectors is projected to the plane having the straight line of the second broken line as its side.

According to the projection view creation method, the curved line to be projected and the curved line representing the cross section of the curved surface to which projection is to be effected are previously divided into the groups of straight lines and these groups are converted a first broken line and a second broken line, respectively. With this processing, the curved line to be projected is converted into an aggregation of the straight lines, and the curved surface to which projection is to be effected is converted into an aggregation of planes. Thereafter, a projection processing is carried out with respect to the straight lines constituting the broken lines.

The first vector is created from an end of one of the divided straight lines of the first broken line, i.e., from one of the vertices of the broken line toward a direction in which the first vector intersects a plane having a side composed of one of the straight lines of the second broken line to determine a straight line of the second broken line of the plane intersecting the first vector. Next, projection is carried out from the first broken line within the range designated by the second vector and the third vector to a group of planes.

Figure 2:
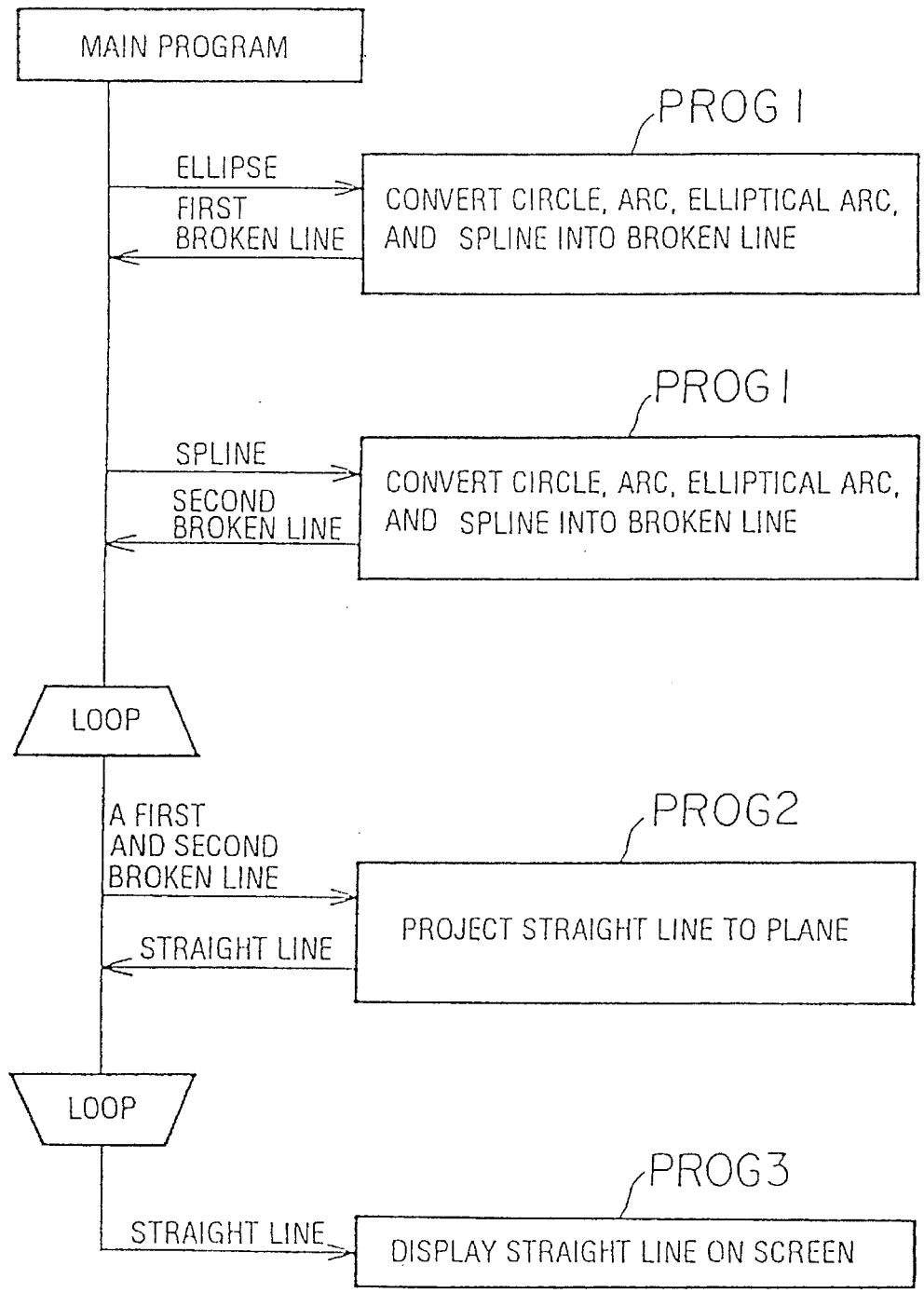
FIG. 2 is a flowchart showing a processing for projecting an ellipse to a curved surface represented by a spline curve.

FIG. 2 is a flowchart showing a processing for projecting an ellipse to a curved surface represented by a spline curve.

When the ellipse is to be projected to the curved surface represented by the spline curve by the two-dimensional CAD system, a process enters a main program for executing a projection processing, and a first program PROG1 processes the previously indicated ellipse to convert it into a first broken line. In the same way, the first program PROG1 processes the previously indicated spline curve to convert it into a second broken line. Note, the first program PROG 1 is a module for converting a circle, arc, ellipse, elliptic arc and spline curve into a broken line.

Next, data of the first broken line and the second broken line converted by the first program PROG1 is processed in a loop. A second program PROG2 as a module for projecting a straight line to a plane receives data of the respective sides of the first broken line and the second broken line to subject the sides to a projection processing so that a straight line when the first broken line is projected to a plane having a straight line of the second broken line as its side is determined. This processing is repeated with respect to all the straight lines constituting the first broken line.

When all the straight lines of the first broken line are projected, a projection view is displayed on a screen by a third program PROG3 as a module for displaying straight lines on the screen.

Figure 3:
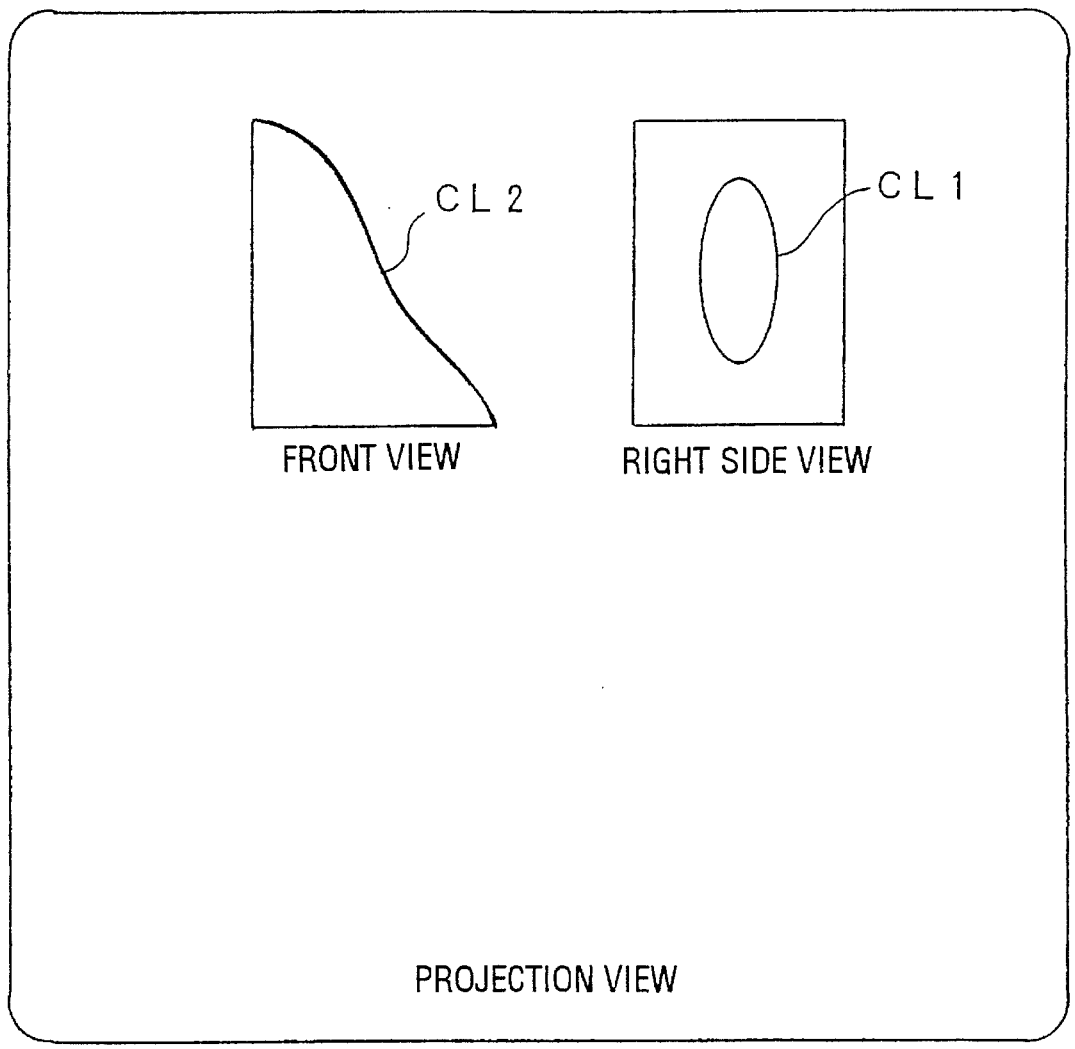
FIG. 3 is a view showing a display on a screen effected by a two-dimensional CAD system by way of example.

FIG. 3 is a view showing a display on a screen effected by the two-dimensional CAD system by way of example. The display example shows a portion of the views of a product observed from three sides, i.e., a right side view is displayed on the right side of the screen and a front view is displayed on the left side thereof.

When a projection view is to be created by projecting an ellipse CL1 at the center of the right side view to a curved surface whose contour is formed by a spline curve CL2 of the front view, first, the spline curve CL2 is indicated by the operation of a designer and thereafter the ellipse CL1 is indicated. Then, the main program for carrying out the projection processing receives the information of the ellipse CL1 and the spline curve CL2 by means of the element numbers of them and supplies the information to the first program PROG1.

For example, when it is supposed that the element number of the ellipse CL1 is "1001", the first program PROG1 searches a database based on the element number and fetches the data of the ellipse CL1. In the same way, when it is supposed that the element number of the spline curve CL2 is "1002", the first program PROG1 searches the database based on the element number and fetches the data of the spline curve CL2.

FIG. 4 is a view showing a data structure of an ellipse by way of example. The data of the ellipse has the same structure as that of the data of an elliptic arc and is composed of a center x-coordinate of the ellipse, center y-coordinate thereof, inclination of the ellipse represented by an angle between a horizontal axis passing through a center coordinate and a major axis, length of the major axis, length of a minor axis, start angle representing an end of the elliptic arc and terminate angle representing the other end of the elliptic arc. In the case of an ellipse, the start angle is fixed to 0° and the terminate angle is fixed to 360°.

FIG. 5 is a view showing a data structure of a spline curve by way of example. The spline curve is composed of the number of vertices representing the number of connections of fine line segments constituting the spline curve, start point of the spline curve, terminate point of the spline curve, start time and terminate time, x- and y-coordinates of a vertex 1 ..., x- and y-vectors of the vertex 1 and interval length 1–2, ...

Figure 6:
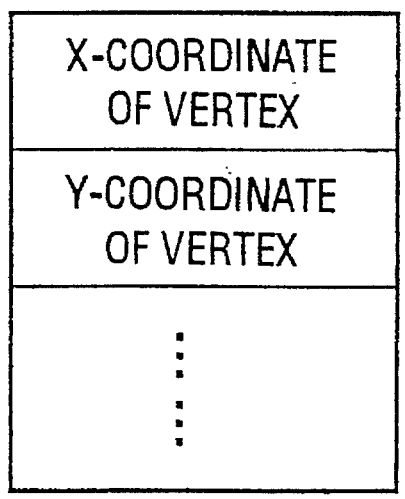
FIG. 6 is a view showing a data structure of a broken line by way of example.

FIG. 6 is a view showing a data structure of a broken line by way of example. The first program PROG1 converts the ellipse and the spline curve into broken lines, respectively based on the data thereof fetched from the database and outputs the ellipse and the spline curve in the common form of broken line data. The data of the ellipse and the spline curve are divided into a plurality of straight lines by the processing for converting them into the broken lines and thus the broken line data are represented by the coordinates at both ends of the respective divided straight lines. More specifically, the broken line data are represented by the x-coordinate of the vertex 1, the y-coordinate of the vertex 1, ... At that time, the first program PROG1 also supplies the number of the vertices to the main program together with the coordinates of the vertices.

Figure 7:
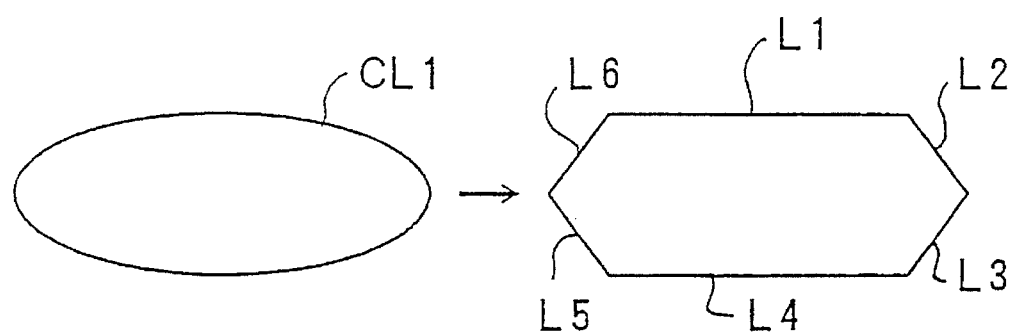
FIG. 7 is a view showing a state that a curved line is converted into a group of straight lines by way of example.

FIG. 7 is a view showing a state wherein a curved line is converted into a group of straight lines by way of example. The illustrated example uses an ellipse as the curved line and is exaggeratedly shown to some degree by reducing accuracy when the ellipse is divided into a group of straight lines constituting a broken line for the convenience of description. The ellipse CL1 is converted into six straight lines L1–L6 here by the first program PROG1.

Figure 8:
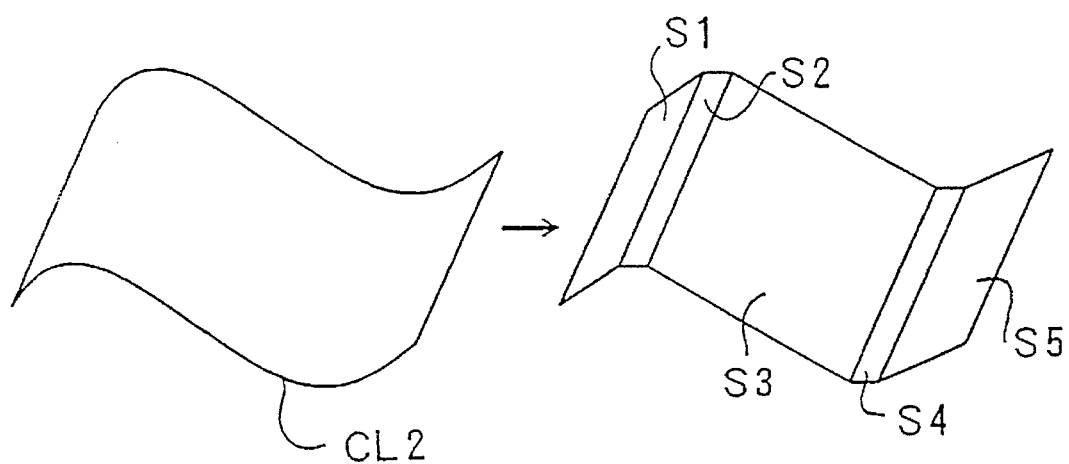
FIG. 8 is a view showing a state that a curved surface is converted into a group of planes by way of example.

FIG. 8 is a view showing a state wherein a curved surface is converted into a group of planes by way of example. Here, the spline curve CL2 stored in the CAD system as data is divided into a group of straight lines to show a spline surface including the spline curve CL2 by an image divided into a group of planes. In the illustrated example, the spline surface is converted into five planes S1–S5 by the first program PROG1.

Next, on the completion of the conversion of the curved line to be projected into the group of the straight lines and the conversion of the curved surface to which projection is effected into the group of the planes as described above, a projection processing is carried out using the group of the straight lines and the group of the planes. The sequence of the projection processing will be described below. When the projection processing is carried out, the main program successively supplies the coordinates of the ends of the respective straight lines determined from the curved line and the coordinates of the ends of the straight line representing a side of the planes determined from the contour of the curved surface to the second program PROG2 for processing. The straight lines created by the projection processing are supplied to the main program in terms of the values representing the coordinates of the ends of the straight lines.

Figure 9:
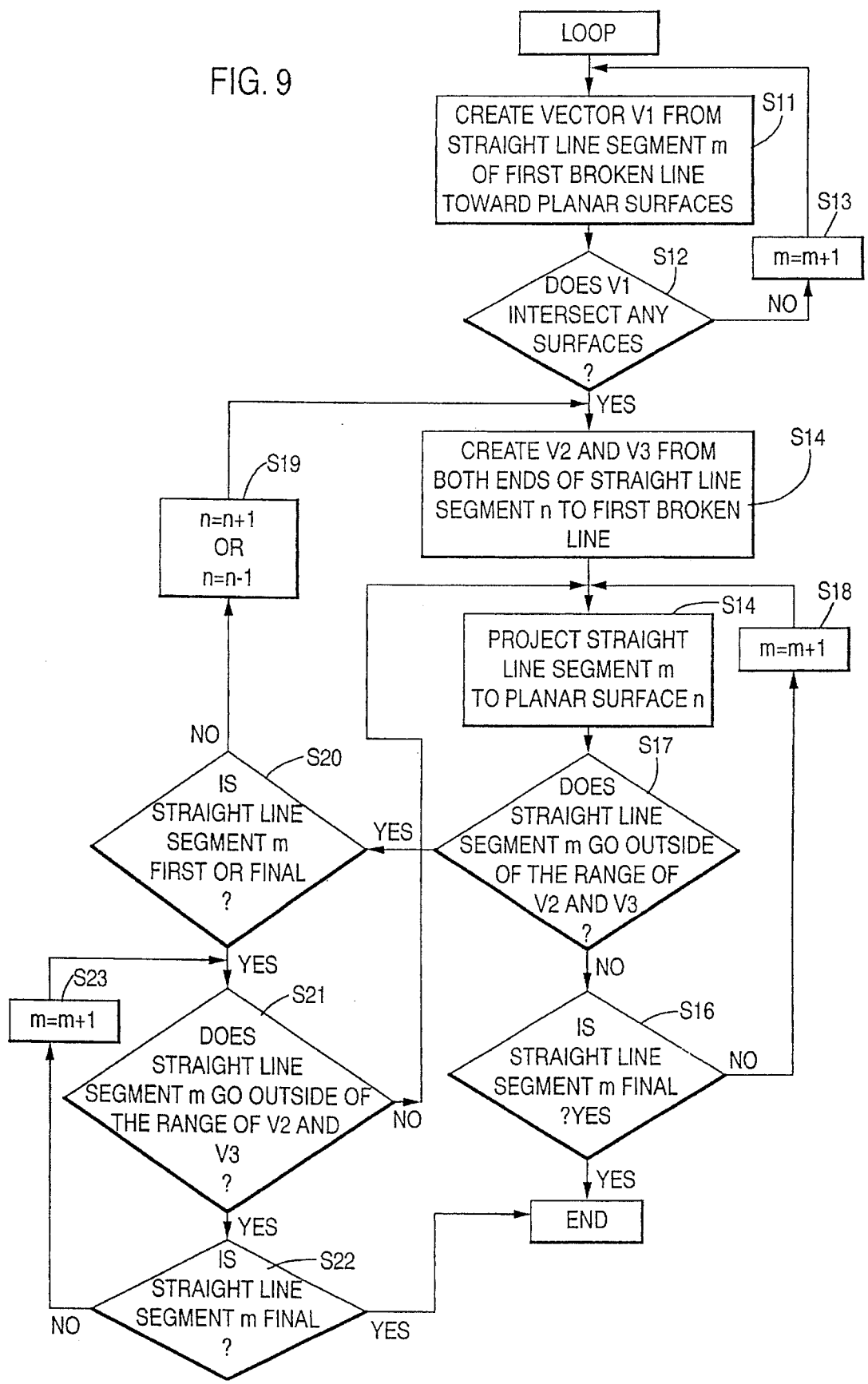
FIG. 9 is a flowchart showing a projection process when a straight line is projected to a plane.

FIG. 9 is a flowchart showing a projection processing when a straight line is projected to a plane. Here, a curved line to be projected, which is, for example, composed of an ellipse is divided into a plurality of straight lines, a curved line approximated by these straight lines is represented by a first broken line ①, the vertices of the first broken line ① are successively represented by m=0, 1, ..., and an arbitrary one of the straight lines is represented by m. On the other hand, with respect to the curved surface to which projection is effected, a spline curve, for example, which represents the cross section of the curved surface is divided into a plurality of straight lines and a curved line approximated by these straight lines is represented by a second broken line ② and an arbitrary one of the straight lines is represented by n.

First, a first vector V1 is tentatively created from the vertex m=0 of the first broken line ① to the curved surface (step S11). Next, it is determined whether the first vector V1 is directed toward a direction in which the vector intersects plane the of the second broken line ② (step S12) having a straight line n=0"; as its side. When the first vector V1 is not directed toward the direction in which the vector intersects the plane having the straight line n the vertex of the first broken line ① is shifted to the next vertex of the first broken line ① and the first vector V1 is created from the vertex m=1 of the first broken line ① (step S13). As described above, the first vector V1 is repeatedly created by changing the position of the vertex until it intersects the curved surface composed of the second broken line ②.

Figure 10:
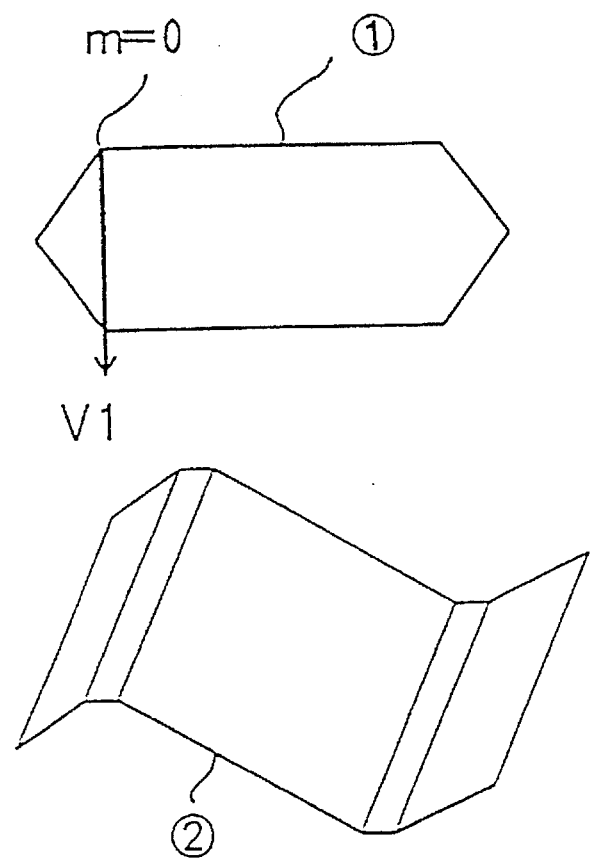
FIG. 10 is a view showing an image when a first vector is created.

FIG. 10 is a view showing an image when the first vector is created. The illustrated example shows a state that the first vector V1 is created from the vertex m=0 of the first broken line ①. When the first vector V1 does not intersect any of the planes composed of the second broken line ②, the first vector V1 is created from the next vertex.

Returning to FIG. 9, next, when the first vector V1 intersects the plane having the straight line n of the second broken line ② as its side, second and third vectors V2 and V3 are created from both ends of the straight line n to the first broken line ① (step S14).

Figure 11:
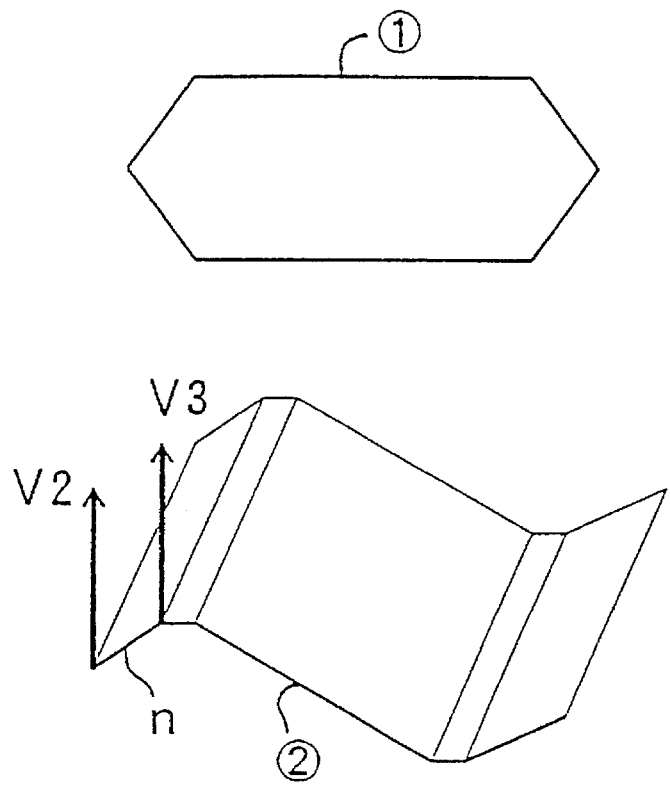
FIG. 11 is a view showing an image when second and third vectors are created.

FIG. 11 is a view showing an image when the second and third vectors are created. In the illustrated example, second and third vectors V2 and V3 are created from the both ends of the straight line, for example, the straight line n of the second broken line ② constituting side of the plane intersecting the first vector V1 from to the first broken line ①.

Returning to FIG. 9 again, the straight line m whose end point is the vertex from which the first vector V1 is created to the plane having the straight line n as its side edge (step S15). Next, it is determined whether the straight line m is final or not (step S16). When the straight line m is final, the projection processing is finished and the process quits the loop.

When the projected straight line m is not final, it is determined whether the other point end points of the straight line m goes outside of the range designated by the second and third vectors V2 and V3 (step S17). When the other end point of the straight line m does not go outside of the range designated by the second and third vectors V2 and V3, the next straight line m+1 is projected (step S18). When the other end point of the straight line m goes outside of the range designated by the second and third vectors V2 and V3, the process is started again from the step that the plane to which projection is to be effected is shifted to the side where the straight line is out of the range and the second and third vectors V2 and V3 are determined again based on the straight line n±1 constituting the side of the plane where the straight line is out of the range (step S19). If the planar surface whose side is represented by straight line n is the first or final plane (i.e., all planes have ben processed—step S20), then any remaining straight line segment m inside the range of V2 and V3 of the first or final place are also projected (steps S21-S23).

Figure 12:
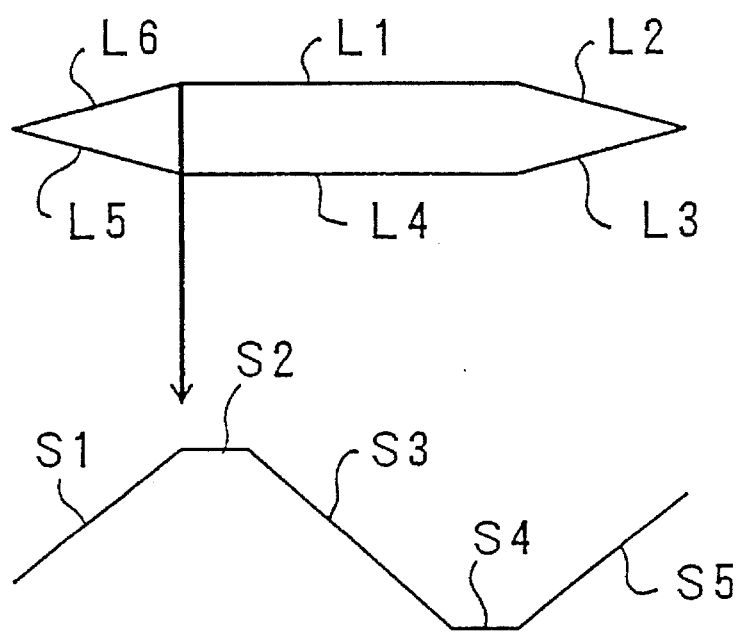
FIG. 12 is a view showing a positional relationship of projection when a first broken line is projected to a second broken line.

FIG. 12 is a view showing a positional relationship of projection when the first broken line is projected to the second broken line. Note, although the second broken line ② is observed just from the transverse direction thereof, the first broken line ① is observed from a slightly upper direction so that it can be easily observed.

According to the aforesaid projection processing, first, a straight line L1 is projected to a plane S2. Next, the straight line L1 is projected to a plane S3. Thereafter, the straight line L1 is projected to a plane S4, a straight line L2 is projected to a plane S5, a straight line L3 is projected to the plane S5, a straight line L4 is projected to a plane S4, the straight line L4 is projected to the plane S3, the straight line L4 is projected to the plane S2, the straight line L5 is projected to the plane S1, and a straight line L6 is projected to the plane S1, in the same way. Since the projection processing is carried out only to the locations where the curved surface to which the projection is to be effected exist, it suffices only to repeat the projection processing ten times in the illustrated example. Incidentally, in a conventional method, the projection processing must be repeated 6×5=30 times when the first broken line ① is divided into six sections and the second broken line ② is divided into five sections.

Figure 13:
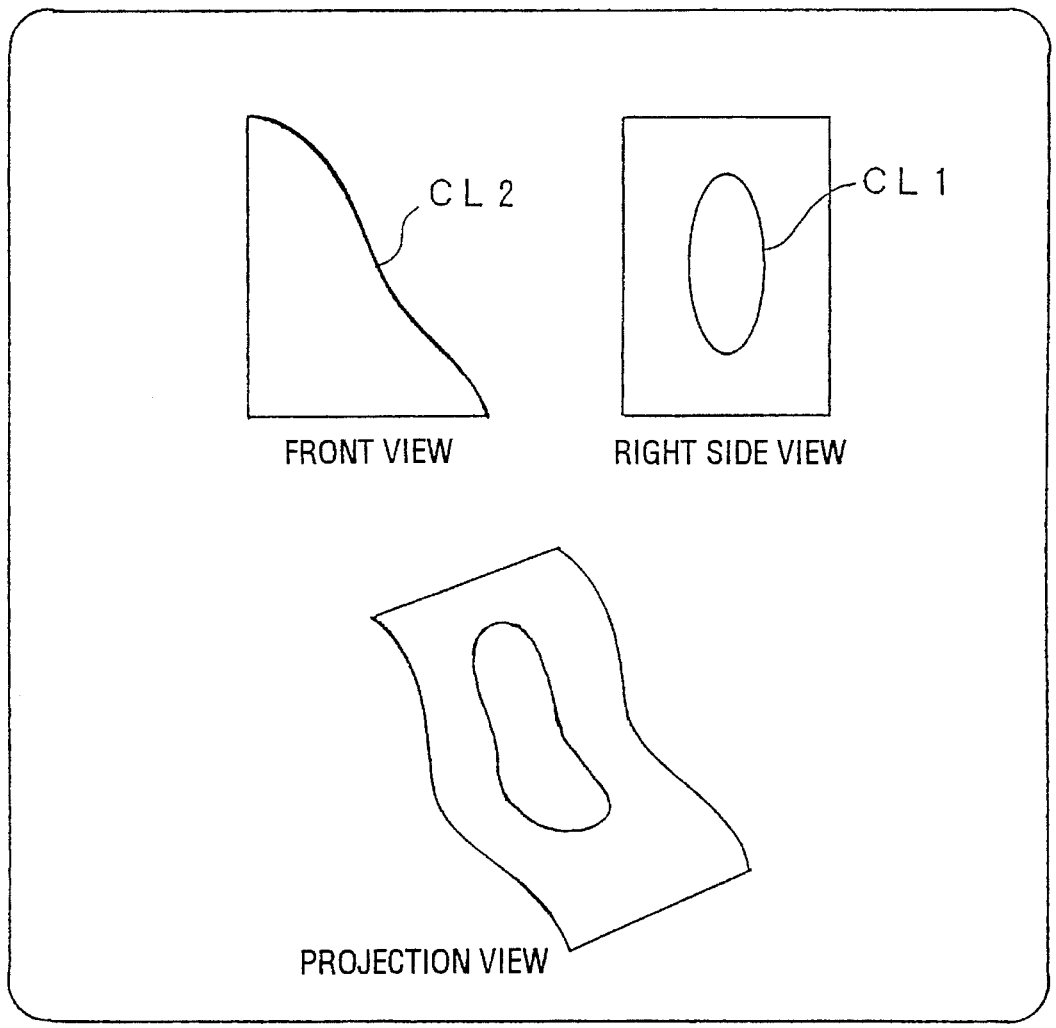
FIG. 13 is a display on a screen of a created projection view by way of example.

FIG. 13 is a view of a display on the screen of a created projection view by way of example. The data of a broken line composed of a group of straight lines having been subjected to the projection processing are supplied from the main program to a third program PROG3 together with the number of vertices and the projection view is displayed on the screen. According to this display example, when the spline curve CL2 and the ellipse CL1 are indicated, the ellipse CL1 is projected to the curved surface whose contour is formed by the spline curve CL2 and a perspective view obtained when a product is observed from an obliquely upper direction is drawn, for example, below the projected ellipse CL1.

Next, a calculation effected by the method of projecting a straight line to a plane will be described by way of example.

Figure 14:
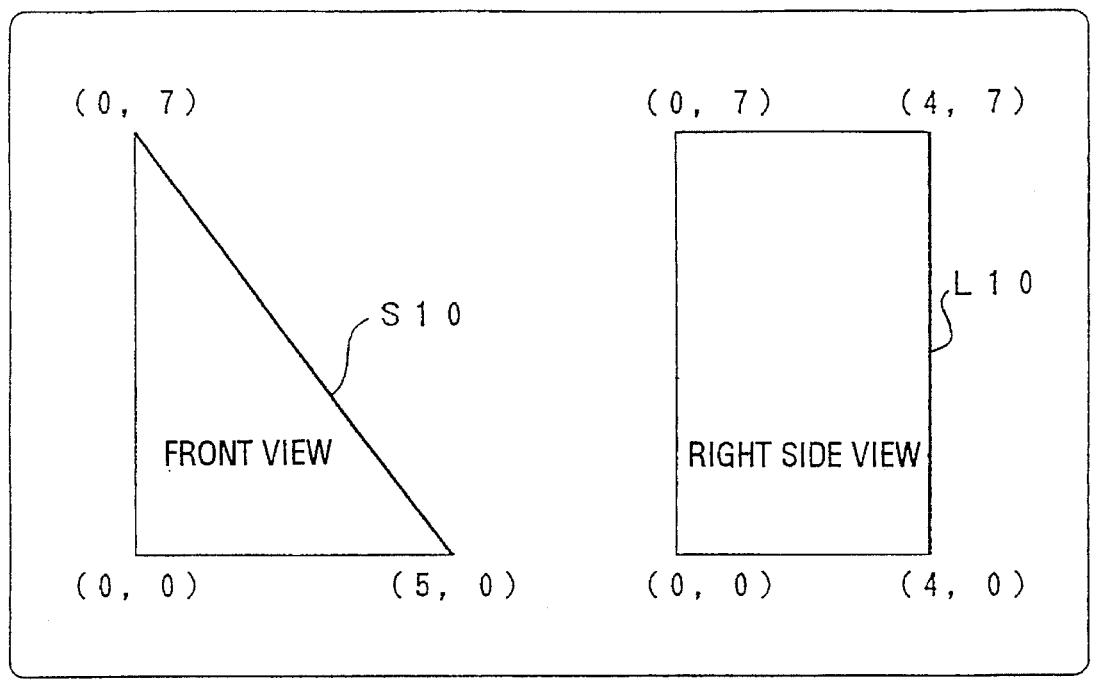
FIG. 14 is a view explaining a method of projecting a straight line to a plane.

FIG. 14 is a view explaining the method of projecting a straight line to a plane. FIG. 14 shows an example in which the straight line L10 illustrated by a thick line of a right side view shown on the right side of the FIG. 14 is projected to the plane S10 illustrated by a thick line of a triangle of a front view shown on the left side of the FIG. 14. The respective vertices of the triangle have coordinates, for example, (0, 0), (0, 7), and (5, 0) and the respective vertices of the right side view have coordinates, for example, (0, 0), (0, 7), (4, 7) and (4, 0). Although there are two coordinates (0, 0) in FIG. 14, this is because the front view and the right side view are drawn on a different coordinate system. First, the point (4, 7) which is one of the end points of the straight line L10 is projected to the plane S10.

First, a direction vector of the plane S10 is determined. The direction vector is determined from the coordinates of the two points of the front view by (0–5, 7–0)=(–5, 7).

Next, a normal vector is determined from the direction vector. When it is assumed here that the normal vector is (a, b), –5a+7b=0 is established from the aforesaid direction vector. When a=7, b=5 is obtained, from which one of the normal vectors can be made to be (7, 5). When this is expressed by a three-dimensional vector, (7, 5, 0) is obtained.

Next, a plane equation of the plane S10 is determined. When the plane equation is assumed as follows, $$ax+by+cz+d=0 \tag{1}$$

since the normal vector is represented by (7, 5, 0), 7x+5y+d=0 is obtained. Since the plane S10 passes through the point (0, 7), 35+d=0, that is, d=–35 is obtained. Thus, the following plane equation of the plane S10 is obtained.

$$7x+5y-35=0 \tag{2}$$

Here, a three-dimensional straight line passing through the point (4, 7) of the right side view and perpendicular to the right side view is considered. It is assumed here that the coordinates of the both ends of the straight line are represented by (4, 7, 20), (4, 7, 20) in terms of three dimension when a length in the Z-direction is tentatively determined "20". When the coordinates are multiplied by a rotation matrix indicating a right side, the following equation is obtained.

$$\begin{pmatrix} 0 & 0 & 1 \\ 0 & 1 & 0 \\ -1 & 0 & 0 \end{pmatrix} \begin{pmatrix} 4 \\ 7 \\ \pm 20 \end{pmatrix} = \begin{pmatrix} \pm 20 \\ 7 \\ -4 \end{pmatrix} \tag{3}$$

Thus, the coordinates of the both ends of the straight line are (20, 7, –4), (–20, 7, –4) when expressed accurately.

Next, a point of intersection of the previously determined three-dimensional straight line and the plane is determined. The point of intersection of the plane and the straight line is expressed by the following equation.

$$P=P0+(S0/(S0-S1))(P1-P0) \tag{4}$$

where, P is a point of intersection, P0 is the start point of a straight line (=(20, 7, –4)), P1 is the terminate point of the straight line (=(–20, 7, –4)), S0 is a value (=140 +35 –35 =–140) obtained by substituting the start point P0 of the straight line for the plane equation (equation 2), and S1 is a value (=–140+35–35=–140) obtained by substituting the terminate point P1 of the straight line for the plane equation (equation 2). Thus, the point of intersection P is expressed by the following equation.

$$P=(0, 7, -4) \tag{5}$$

As a result, the point (4, 7) of the right side view is represented by (0, 7, –4) in terms of three-dimension.

Next, the thus determined three-dimensional coordinates are returned to two-dimensional coordinates. When they are returned to the two-dimensional coordinates, from which direction a view is to be observed is predetermined. Since the view is usually drawn so that it is obliquely observed (isometric view) in many cases, however, when a rotation matrix indicating the isometric view is multiplied, the following equation is obtained.

$$\begin{pmatrix} 1 & 0 & 0 \\ 0 & \cos-\frac{\pi}{4} & -\sin\frac{\pi}{4} \\ 1 & \sin\frac{\pi}{4} & \cos\frac{\pi}{4} \end{pmatrix} \begin{pmatrix} \cos-\frac{\pi}{4} & 0 & \sin-\frac{\pi}{4} \\ 0 & 1 & 0 \\ -\sin-\frac{\pi}{4} & 0 & \cos-\frac{\pi}{4} \end{pmatrix} \begin{pmatrix} 0 \\ 7 \\ -4 \end{pmatrix} = \tag{6}$$

$$\begin{pmatrix} -4\sin-\frac{\pi}{4} \\ 7\cos\frac{\pi}{4} - 4\left(-\sin\frac{\pi}{4}\right)\left(\cos-\frac{\pi}{4}\right) \\ 7\sin\frac{\pi}{4} - 4\left(\cos\frac{\pi}{4}\right)\left(\cos-\frac{\pi}{4}\right) \end{pmatrix}$$

As a result, a coordinate when one of the points (4, 7) of the straight line L10 of the right side view is projected is obtained. In the same way, a coordinate when the other point (4, 0) of the straight line L10 of the right side view is projected is also obtained. A view when the straight line L10 of the right side view is projected to the plane S10 of the front view is obtained by drawing a straight line using these coordinates.

Figure 15:
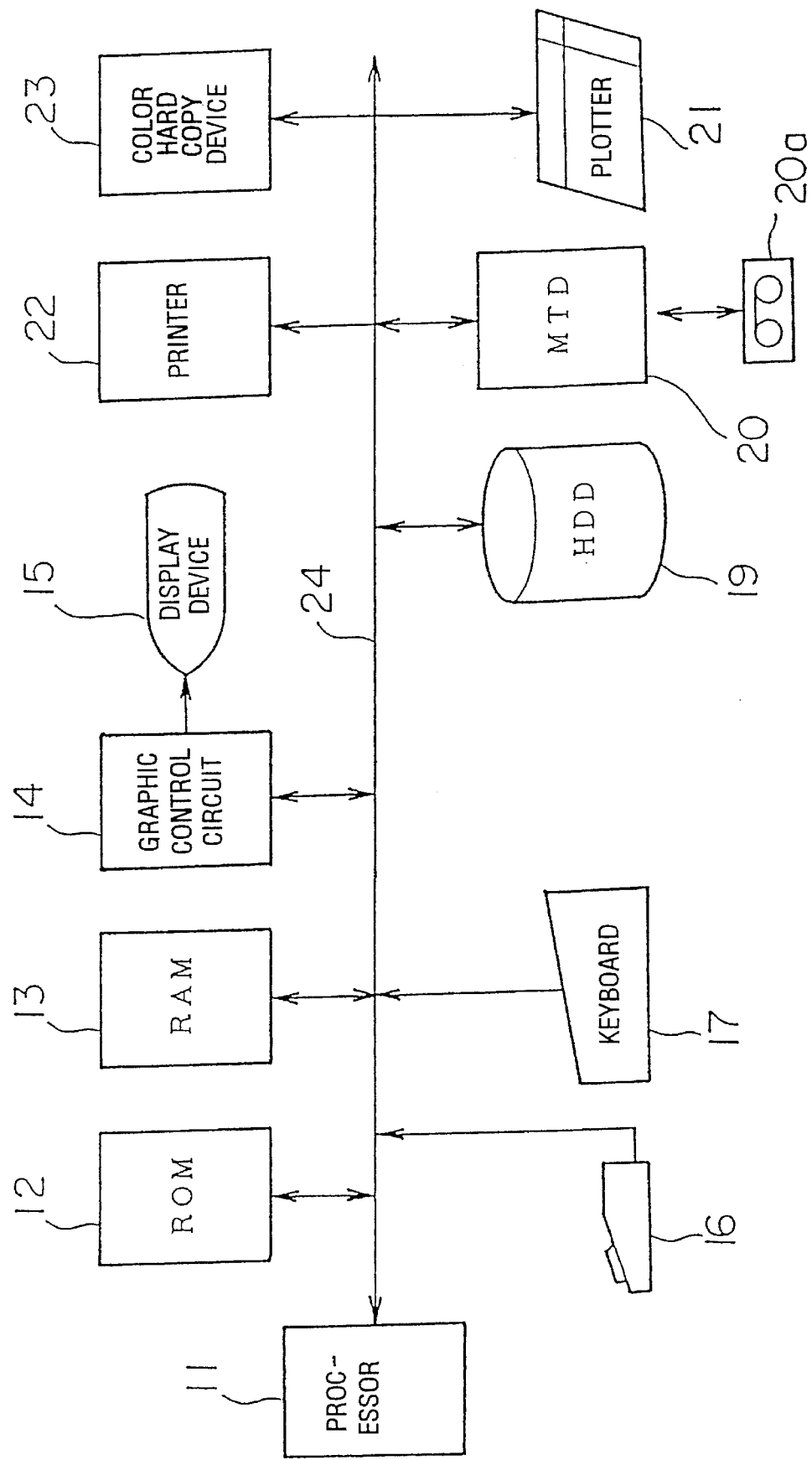
FIG. 15 is a block diagram showing a hardware arrangement of a work station embodying the present invention.

FIG. 15 is a block diagram showing a hardware arrangement of a work station embodying the present invention by way of example. In FIG. 15, the work station is composed of a processor 11, a read only memory (ROM) 12, a main memory (RAM) 13, a graphic control circuit 14, a display device 15, a mouse 16, a keyboard 17, a hard disk drive (HDD) 19, a magnetic tape drive (MTD) 20, a plotter 21, a printer 22, and a color hard copy device 23. These components are interconnected through an interface controller (not shown) and a bus 24.

The processor 11 integrally controls the workstation as a whole. The read only memory 12 stores, for example, a program necessary for start up and the like. The main memory 13 includes a system program, application programs for a two-dimensional CAD system and the like which are developed therein as well as creates and stores drawings, projected views, data being edited and the like.

The graphic control circuit 14 includes a frame memory and the like, converts various figure element data such as two-dimensional line segment data, circle data, arc data, elliptical arc data, spline curve data, projected view data and the like into display signals and supplies the display signals to the display device 15. The display device 15 displays a view composed of the figure elements based on the received display signals.

The mouse 16 is a pointing device for moving a cursor displayed on the screen of the display device 15, hitting a figure element displayed on the screen when a button is clicked and indicating the selection of various menus. In particular, when a projected view is to be created, the mouse 16 is used to indicate elements to be projected and a plane to which projection is effected. The keyboard 17 is used to input numerical data such as a value for indicating a length of a straight line by which a curved line is divided, and the like.

The hard disk drive 19 stores the system program, the application programs including a program for crating a projected view by the two-dimensional CAD system, various figure element data necessary to make drawings, a search range setting table and the like. The magnetic tape drive 20 is an external memory device capable of inputting data such as design drawings and the like stored in a magnetic tape 20a and storing data such as created design drawings and the like to the magnetic tape 20a.

Further, the data of created design drawings can be output through the plotter 21, the printer 22 or the color hard copy device 23.

As described above, according to the present invention, a curved line to be projected is divided into a group of straight lines and a curved surface to which projection is effected is divided into a group of planes so that they can be represented by common figure elements without depending upon particular figures, a first vector is created from a broken line composed of the straight lines and a plane intersecting the first vector is searched, second and third vectors are created from a plane intersecting the first vector to the broken line, and the straight lines of the broken line are projected to the planes within the ranges designed by these vectors.

As a result, a calculation formula applied to each figure to be subjected to a projection processing need not be prepared and thus a program can be made relatively simple. Further, since only straight lines which must be subjected to the projection processing are projected, the number of repetition of projecting lines can be greatly reduced so that the speed of the projection processing can be increased. Further, curved surfaces and curved lines which cannot be processed up to now can have been processed by only the addition of a processing for converting them into a plane and straight line.

The foregoing is considered as illustrative only of the principles of the present invention. Further, since numerous modifications and changes will readily occur to those skilled in the art, it is not desired to limit the invention to the exact construction and applications shown and described and accordingly, all suitable modifications and equivalents may be regarded as falling within the scope of the invention in the appended claims and their equivalents.

What is claimed is:

1. A method of projecting a curved line onto a curved surface to create a projection view in a CAD system, comprising the steps of:
   (a) dividing and converting a first curved line into a first group of straight line segments, and a second curved line, representing a cross section of a curved surface onto which projection of the first curved line is effected, into a second group of straight line segments;
   (b) forming planar surfaces, each of the planar surfaces having one side defined by one of the straight line segments of said second group of straight line segments;
   (c) selecting a first one of the straight line segments of said first group of straight line segments by forming a first vector directed toward said planar surfaces and determining whether said first vector intersects any of said planar surfaces;
   (d) forming first and second vectors directed toward said first group of straight line segments at two ends of one of the straight line segments defining the one side of the planar surface intersected by said first vector; and
   (e) projecting first group of straight line segments within a range designated by said first and second vectors onto said planar surfaces, said protecting being started with said first one of the straight line segments of said first group of straight line segments.

2. A method according to claim 1, wherein said projecting in step (e) completes when all the straight line segments of said first group of straight line segments are projected onto said planar surfaces.

3. A method according to claim 1, wherein said projecting in step (e) further comprises the step of forming fourth and fifth vectors when a projected straight line segment from said first group of straight line segments falls outside of the range designated by said second and third vectors formed by step (d), said fourth and fifth vectors being formed at the two ends of another one of the straight line segments of said second group of straight line segments and defining a range encompassing said projected straight line segment.

* * * * *